United States Patent [19]

Scott et al.

[11] Patent Number: 4,585,753

[45] Date of Patent: Apr. 29, 1986

[54] LIQUID CHARCOAL AND A METHOD OF PREPARING THE SAME

[76] Inventors: Aaron Scott; Barbara F. Scott, both of P.O. Box 13298, Orlando, Fla. 32859

[21] Appl. No.: 683,926

[22] Filed: Dec. 20, 1984

[51] Int. Cl.$^4$ .................. B01J 20/20; B01J 20/26; A01G 1/00
[52] U.S. Cl. .................. 502/401; 47/9; 47/58; 47/DIG. 10; 252/351; 502/416
[58] Field of Search .............. 502/416, 413, 401, 403, 502/404, 158, 180; 44/51; 106/307; 427/136; 47/9, 58, DIG. 10; 137/13; 252/351

[56] References Cited

U.S. PATENT DOCUMENTS 3,960,763  6/1976  Lambou et al. .................. 502/403
4,358,293  11/1982  Mark ............................ 252/351
4,488,881  12/1984  Mark ............................ 44/51

*Primary Examiner*—P. E. Konopka
*Attorney, Agent, or Firm*—William M. Hobby, III

[57] ABSTRACT

An aqueous suspension of activated charcoal provides an inexpensive method for detoxifying large areas of soil and turf contaminated with organic pesticides.

6 Claims, No Drawings

LIQUID CHARCOAL AND A METHOD OF PREPARING THE SAME

BACKGROUND OF THE INVENTION

This invention relates to an aqueous suspension of activated charcoal for treatment of soil and turf contaminated with organic pesticides, and a method of preparing the same.

The use of activated charcoal in filters to detoxify water and other liquids, in gas masks for the purification of air, and various other applications, through the process of adsorption, is well-known and widespread. Typically, activated charcoal is used in solid form, as a powder removed by filtration, or as a bed of granular material through which contaminated liquid or vapor is passed. However, a composition of liquified charcoal suitable for spraying large areas of soil or turf, and the method of preparing such a composition, are unknown. Charcoal is frequently liquified in various processes for making activated charcoal, but the end product is usually solidified and may contain different types of binders.

SUMMARY OF THE INVENTION

The object of this invention is to provide an aqueous suspension of activated charcoal for application as a spray, to deactivate toxic organic residues of pesticides and herbicides in soil or turf. The suspension utilizes a wetting agent, a suspending agent and a defoaming agent. Another object of the invention is to provide a process of preparing such aqueous suspension of activated charcoal.

DETAILED DESCRIPTION OF THE INVENTION

The ingredients for this invention consist of activated charcoal, a surfactant and a suspending agent, a defoaming agent and water. The composition can be prepared by the following process. A mixing tank is filled with approximately 60 to 95 gallons of water equal to about $\frac{7}{8}$ of the desired final volume of the suspension. A surfactant and suspending agent, generally about 2.56 ounces per gallon of mixture, are slowly added to the water while agitating the mixture. Agitation is continued throughout the entire mixing process. A defoaming agent, approximately 0.64 ounces per gallon, is then added. Next, powdered activated charcoal, W-20, 2 to 2.25 pounds per gallon of aqueous suspension, is gradually added. Additional surfactant and suspending agent, approximately 2 pounds per gallon of mixture, are added next, together with sufficient water to attain the desired volume. Agitation is then continued for at least 30 minutes, and preferably for an hour. The invention will be more fully understood by reference to the examples which follow.

EXAMPLE 1

220 pounds of powdered activated carbon are gradually added to a mixture of 95 gallons of water, 17 pounds of octyl phenoxy polyethoxy ethanol and 72 ounces of polydimethylsiloxane, during continuous agitation, followed by the addition of another 43 pounds of octyl phenoxy polyethoxy ethanol, and water sufficient to bring the volume of the suspension to 110 gallons.

EXAMPLE 2

Using the ingredients and amounts thereof in Example 1, the suspension is prepared by the following method:
(1) Filling a mixing tank with 95 gallons of water.
(2) Agitating the contents of the tank throughout addition of the ingredients.
(3) Gradually adding 17 pounds of octyl phenoxy polyethoxy ethanol.
(4) Adding 72 ounces of polydimethylsiloxane.
(5) Gradually adding 220 pounds of powdered activated carbon.
(6) Adding 43 more pounds of octyl phenoxy polyethoxyethanol.
(7) Adding water sufficient to make 110 gallons.
(8) Continued agitation of the suspension for one hour.

The resulting aqueous suspension of activated charcoal is suitable for spray application over large areas of turf or soil contaminated with residues of organic pesticides, fungicides, insecticides, and some hydraulic fluids or petroleum products, at the rate of one gallon or more of suspension per 1,100 square feet of area to be treated.

For terminating effects of pre-emergent crabgrass herbicides, the suspension should be applied at the rate of one gallon of suspension per 2,200 square feet to be treated. For best results, some agitation or stirring of the suspension is recommended prior to use.

I claim:
1. An aqueous suspension of activated charcoal for use as an agricultural spray consisting of:
   (a) water;
   (b) activated charcoal having a range of powdered, activated charcoal from 2.00 to 2.25 pounds per gallon of aqueous suspension;
   (c) a wetting and suspending agent consisting of octylphenoxypolyethoxy ethanol, having a range of 8.96–9.10 ounces per gallon of aqueous suspension;
   (d) a defoaming agent.
2. An aqueous suspension of activated charcoal according to claim 1, wherein the defoaming agent is polydimethylsiloxane having a range of 0.5–0.75 ounces per gallon of aqueous suspension.
3. An aqueous suspension of activated charcoal for use as an agricultural spray consisting of:
   (a) water;
   (b) activated charcoal having a range of powdered, activated charcoal from 2.00 to 2.25 pounds per gallon of aqueous suspension;
   (c) octylphenoxypolyethoxy ethanol, having a range of 8.96 to 9.10 ounces per gallon of aqueous suspension, as a wetting and suspending agent; and
   (d) polydimethylsiloxane having a range of 0.5 to 0.75 ounces per gallon of aqueous suspension as a defoaming agent.
4. A method of suspending activated charcoal in water, comprising the following steps:
   (a) mixing together a defoaming agent, approximately one-fourth of the total amount to be used of a wetting and suspending agent, and an amount of water equal to approximately 7/8ths of the final volume of suspension;
   (b) continuously agitating the combination of ingredients, throughout the mixing process;
   (c) adding powdered activated charcoal, in an amount from 2.00 to 2.25 pounds per gallon of aqueous suspension;

(d) adding the balance of the wetting and suspending agent;

(e) adding the balance of water required to make the final volume; and (f) continuing the agitation of the resulting suspension for at least 30 minutes.

5. A method of suspending activated charcoal in water, according to claim 4 wherein the step of adding the wetting and suspending agent includes adding octylphenoxypolyethocy ethanol having a range of 8.96–9.10 ounces per gallon of aqueous suspension.

6. A method of preparing an aqueous suspension of activated charcoal for use as an agricultural spray, comprising the following steps:

(a) mixing together water and octylphenoxypolyethoxy ethanol having a range of 2.5 to 2.6 ounces per gallon of aqueous suspension;

(b) agitating the ingredients and maintaining agitation throughout the mixing process;

(c) adding polydimethylsiloxane, having a range of 0.5 to 0.75 ouces per gallon of aqueous suspension;

(d) gradually adding from 2.00 to 2.25 pounds of activated charcoal per gallon of aqueous suspension;

(e) adding additional octylphenoxypolyethoxy ethanol from 6.46 to 6.75 ounces per gallon of aqueous suspension;

(f) adding sufficient water, to attain the above-specified concentrations of ingredients; and (g) agitating the resulting aqueous suspension for at least 30 minutes.

* * * * *